(12) United States Patent
Kato (10) Patent No.: US 8,370,733 B2
(45) Date of Patent: Feb. 5, 2013

(54) INFORMATION PROCESSING APPARATUS, ITS CONTROL METHOD, AND PROGRAM

(75) Inventor: Yutaka Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 11/781,447

(22) Filed: Jul. 23, 2007

(65) Prior Publication Data

US 2008/0163044 A1 Jul. 3, 2008

(30) Foreign Application Priority Data

Dec. 27, 2006 (JP) .................................. 2006-352926

(51) Int. Cl.
*G06F 17/27* (2006.01)
(52) U.S. Cl. ......... 715/217; 715/212; 715/221; 715/227
(58) Field of Classification Search .................. 715/221, 715/766–767, 212, 217, 227
See application file for complete search history.

(56) References Cited

U.S. PATENT DOCUMENTS

| 6,057,837 | A * | 5/2000 | Hatakeda et al. ............. 715/765 |
| 6,185,582 | B1 * | 2/2001 | Zellweger et al. ............. 715/212 |
| 6,738,770 | B2 * | 5/2004 | Gorman ............................... 1/1 |
| 2006/0078228 | A1 * | 4/2006 | Tsutaki ........................ 382/298 |
| 2006/0080594 | A1 * | 4/2006 | Chavoustie et al. .......... 715/503 |
| 2006/0080595 | A1 | 4/2006 | Chavoustie et al. .......... 715/503 |

FOREIGN PATENT DOCUMENTS

| EP | 0 965 932 A2 | 12/1999 |
| JP | 05-067126 A | 3/1993 |
| JP | 09-081647 A | 3/1997 |
| JP | 09-259200 A | 10/1997 |
| JP | 2000-029451 A | 1/2000 |
| JP | 2003-122468 A | 4/2003 |
| JP | 2005-339417 A | 12/2005 |
| JP | 2008-516321 A | 5/2008 |
| JP | 2008-517321 A | 5/2008 |
| WO | WO 2006/037733 A2 | 4/2006 |

OTHER PUBLICATIONS

Ron Person; Special Edition Using Microsoft Excel 97; Dec. 17, 1996; Que Publishing; pp. 554, 769-771.*
Patrick Blattner; Special Edition Using Microsoft Excel 2002; May 18, 2001; Que Publishing; pp. 11, 36-37.*
T. Abe, "Encyclopedia of Excel 2000," Natsumesha Co., Ltd., 1st Version, Jul. 30, 2000, pp. 161-166.

* cited by examiner

*Primary Examiner* — Doug Hutton, Jr.
*Assistant Examiner* — Andrew Dyer
(74) *Attorney, Agent, or Firm* — Fitzpatrick, Cella, Harper & Scinto (57) ABSTRACT

In the case of editing document data that has a plurality of fields, by allowing the user to identify a field that is closely related to the selected field, operability of the editing operation of the document data is improved. A selection field detecting unit detects one of the fields according to the operation of the user. An automatic level allocating process executing unit decides the relation degrees between the detected selection field and the other fields. A field enlarging/contracting unit and a display screen control unit switch display control regarding those other fields based on the relation degrees.

3 Claims, 12 Drawing Sheets

```
<form>
  <fields>  601
    <field name="money_a" coordinate="10.50" ref="sum" color="black"/>
    <field name="money_b" coordinate="10.60" ref="sum" color="black"/>
    <field name="money_c" coordinate="10.70" ref="sum" color="black"/>
                    :
    <field name="money_n" coordinate="10.100" ref="sum" color="black"/>
    <field name="sum" coordinate="10.110" color="black">
      <function type="summary">
        <arg name="money_a">
        <arg name="money_b">
                    :
        <arg name="money_n">
      </function>
    </field>
  </fields>
</form>
```

| FIELD | RELATION LEVEL OF FIELD |
|---|---|
| FIELD B1 | 0 |
| | |
| | |
| | |

(a) FIELD  (b) RELATION LEVEL OF FIELD

FIG. 9B

| FIELD | RELATION LEVEL OF FIELD |
|---|---|
| FIELD A1 | 2 |
| FIELD A2 | 4 |
| ⋮ | ⋮ |
| FIELD B1 | 0 |
| FIELD B2 | 4 |
| ⋮ | ⋮ |
| FIELD C1 | 1 |
| FIELD C2 | 3 |
| ⋮ | ⋮ |
| FIELD Cn | 3 |
| FIELD D | 2 |

ENLARGING METHOD SETTING DIALOG DIALING PER LEVEL — 902

DURING SELECTION (LEVEL 0) — 901
- SIZE
  - ⦿ %  X: 120  Y: 120
  - ○ cm  5    1
  - ○ AUTO    ○ NO CHANGE
- COLOR — 904
  - ⦿ ▨
  - ○ AUTO
  - ○ NO CHANGE

903

LEVEL 1
- SIZE
  - ⦿ %  X: 110  Y: 110
  - ○ cm  4.5   0.7
  - ○ AUTO    ○ NO CHANGE
- COLOR
  - ⦿ ▨
  - ○ AUTO
  - ○ NO CHANGE

LEVEL 2
- SIZE
  - ⦿ %  X: 105  Y: 105
  - ○ cm  3    0.5
  - ○ AUTO    ○ NO CHANGE
- COLOR
  - ⦿ ☐
  - ○ AUTO
  - ○ NO CHANGE

905 — [ADD]

INFORMATION PROCESSING APPARATUS, ITS CONTROL METHOD, AND PROGRAM

BACKGROUND OF THE INVENTION

1. Field of the Invention

The present invention relates to a technique for enabling operability of the system for editing form data having a plurality of fields to be improved.

2. Description of the Related Art

In an electronic document system, printing is efficiently executed by inserting data which changes dynamically into a regular template portion (form template) of a document. Although an input source of the data which is inserted is ordinarily a database or the like, there is also a case where the data is manually input. The data is manually input in a case where the data does not exist in the database and the user wants to overwrite information temporarily and print the document, or the like.

Hitherto, in the case of manually inputting the insertion data, an input display screen differs largely from the actual print image. For example, the input display screen has a screen construction in which label names such as "customer number", "product name", and the like of the necessary number and fields for inputting if the necessary number are listed. Such an input display screen differs extremely from an actual document image obtained after the printing. In recent years, however, there has been known a technique called an "input form" in which the user who uses the system can directly input and change the insertion data to a document edition display screen which is close to or identical to the actual print image (for example, Japanese Patent Application Laid-Open No. 2003-122468). According to such a prior art, since the user can easily imagine a final print image, he can efficiently perform the inputting operation.

However, according to the above prior art, there is such a problem that although the user wants to refer to another field related to the field which is being input, since such another related field is in a displaying state in a manner similar to those of other fields, it is difficult to identify the related fields.

SUMMARY OF THE INVENTION

It is, therefore, an object of the invention that in the case of editing form data having a plurality of fields, by allowing the user to identify the field whose degree of relation to the selected field is high, an operability of the editing work of the form data is improved.

According to the invention, there is provided an information processing apparatus for editing form data having a plurality of fields in which data is arranged, comprising: a selecting unit adapted to select one of the plurality of fields according to an operation of a user; a managing unit adapted to manage relation degrees between the field selected by the selecting unit and the plurality of other fields; and a display control unit adapted to switch display control regarding the plurality of other fields based on the relation degrees which are managed by the managing unit.

According to the invention, there is provided a control method for an information processing apparatus for editing form data having a plurality of fields in which data is arranged, comprising: selecting one of the plurality of fields according to an operation of a user; managing relation degrees between the field selected by the selection and the plurality of other fields; and switching display control regarding the plurality of other fields based on the relation degrees which are managed by the management.

According to the invention, there is provided a program for allowing a computer to execute a control method for an information processing apparatus for editing form data having a plurality of fields in which data is arranged, wherein the program comprises: selecting one of the plurality of fields according to an operation of a user; managing relation degrees between the field selected by the selection and the plurality of other fields; and switching display control regarding the plurality of other fields based on the relation degrees which are managed by the management.

Further features of the present invention will become apparent from the following description of exemplary embodiments with reference to the attached drawings.

BRIEF DESCRIPTION OF THE DRAWINGS

FIG. 8 composed of FIGS. 8A and 8B is a flowchart showing in detail a detecting process of related fields and an automatic level allocating process of each field.

DESCRIPTION OF THE EMBODIMENTS

Exemplary embodiments to which the invention has been applied will be described in detail hereinbelow with reference to the drawings.

First Embodiment

Figure 1:
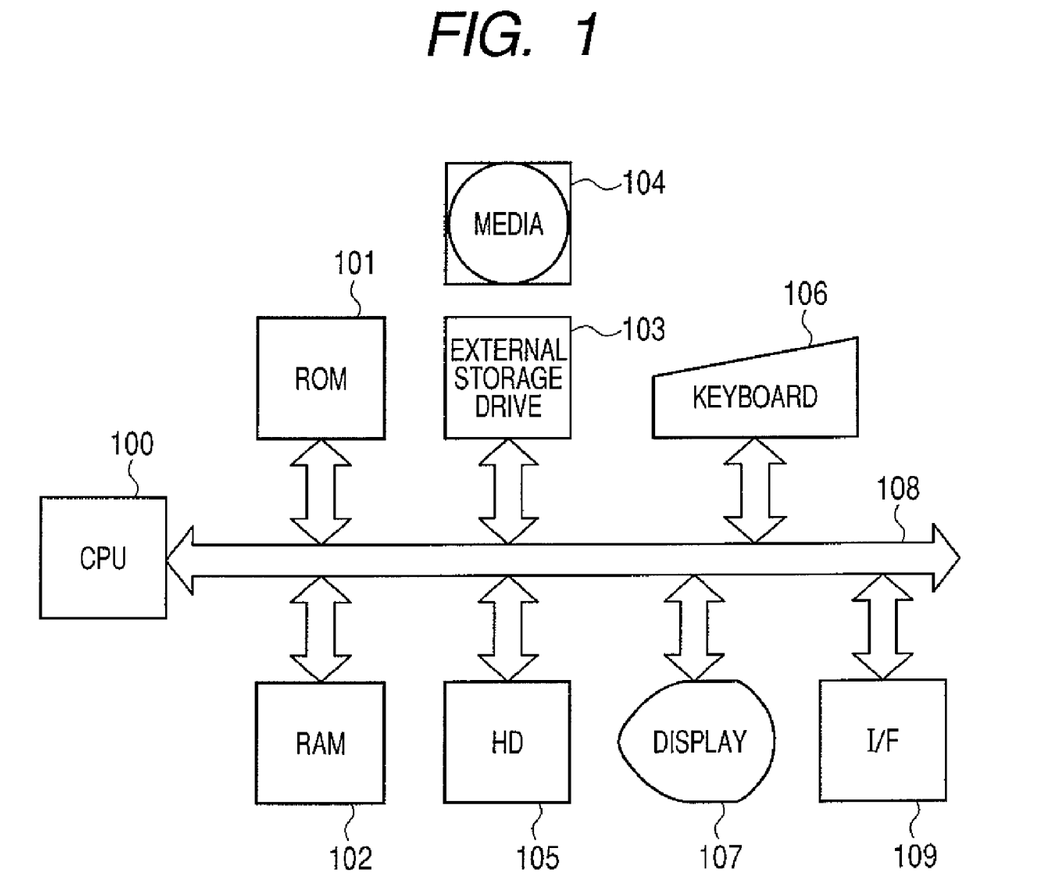
FIG. 1 is a block diagram illustrating a schematic construction of a computer system according to an embodiment of the invention.

First, the first embodiment of the invention will be described. FIG. 1 is a block diagram illustrating a schematic construction of a computer system (information processing apparatus) according to the first embodiment of the invention.

A CPU 100 executes an application program, a printer driver program, an OS, a network printer control program, and the like stored in an HD (hard disk) 105.

The CPU 100 also makes control for temporarily storing information, files, and the like necessary to execute the programs into a RAM 102. Programs such as a basic I/O program and the like and various kinds of data such as font data which is used when executing a document process, data for a template, and the like have been stored in a ROM 101.

The RAM 102 functions as a main memory, a work area, or the like of the CPU 100. An external storage drive 103 can load programs and the like stored in a media 104 into the computer system.

The programs and related data in the embodiment have been stored in the media 104.

The application program, printer driver program, OS, control program, related programs, and the like have been stored in the HD (hard disk) 105. A keyboard 106 is used for the user to input and instruct a command such as a control command of a device or the like to the computer system.

A display 107 displays the command input from the keyboard 106, a state of a printer, or the like.

A system bus 108 is used to transmit the data in the computer system. A network interface 109 is a communication interface for connecting to a local area network (LAN), Internet, or the like.

Figure 2:
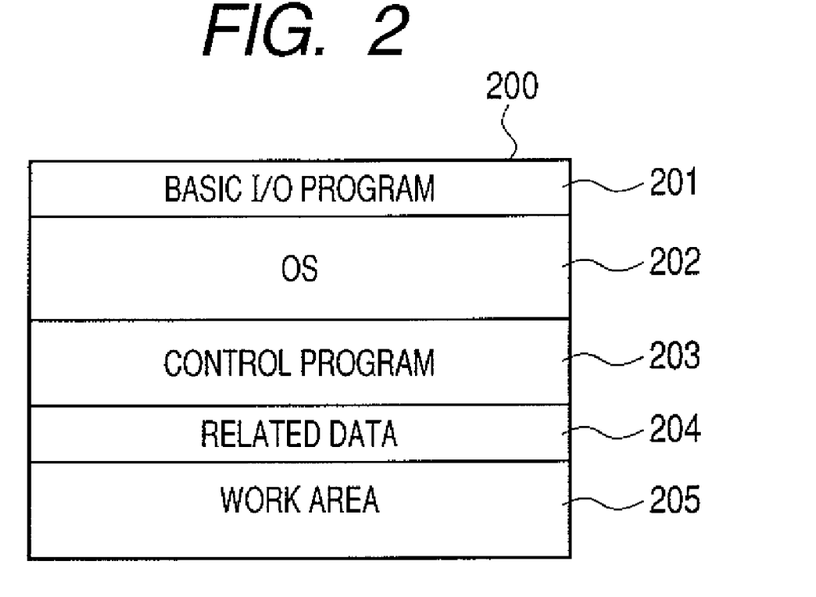
FIG. 2 is a diagram illustrating a memory map in a state where programs in the embodiment of the invention have been loaded into a RAM and can be executed.

FIG. 2 is a diagram illustrating a memory map in a state where the programs in the embodiment have been loaded into the RAM 102 and can be executed.

In the embodiment, although an example in which the programs and the related data are directly loaded from the media 104 into the RAM 102 and executed is shown, the programs may be loaded from the HD 105 into the RAM 102.

The media 104 (recording medium) to record the programs and the like may be one of an FD, a CD-ROM, a DVD, an IC memory card, and the like. Further, it is also possible to construct in such a manner that the programs are preliminarily recorded into the ROM 101, used as a part of the memory map, and directly executed by the CPU 100.

A basic I/O program storing area 201 is provided. The basic I/O program storing area 201 contains a program having such an IPL (Initial Program Loading) function or the like that when a power source of the computer system is turned on, the OS is read out of the HD 105 and stored into the RAM 102 and the operation of the OS is started.

An OS storing area 202 is provided. The control program is developed in an area 203. The related data is developed in an area 204. A work area for allowing the CPU 100 to execute the programs is provided in an area 205.

Figure 3:
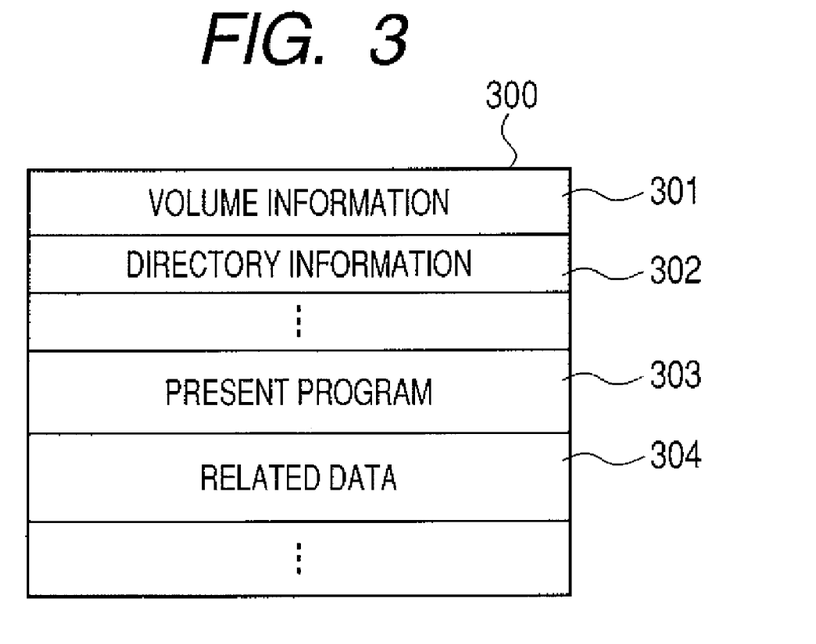
FIG. 3 is a diagram illustrating a data storing state in a media.

FIG. 3 is a diagram illustrating a data storing state in the media 104. Data contents 300 are stored in the media 104.

Volume information 301 indicates information of the data. There are directory information 302, a program 303, and its related data 304. The program 303 to execute the processing operation shown in flowcharts of FIGS. 6 and 8 has been encoded.

Figure 4A:
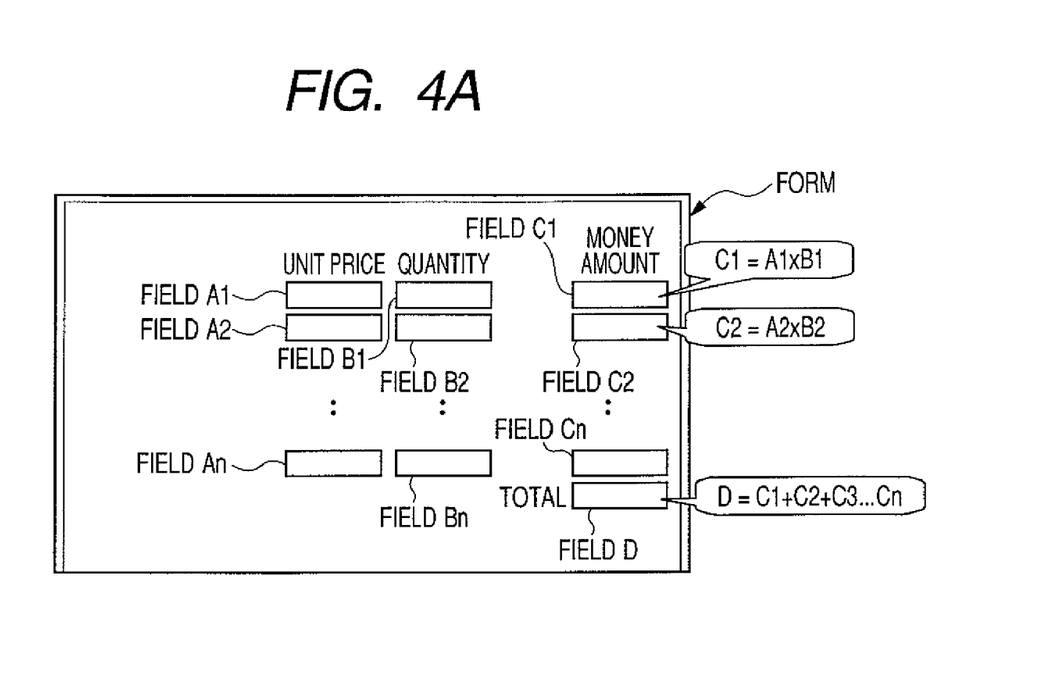
FIGS. 4A, 4B and 4C are diagrams for describing an outline of the operation of the computer system according to the embodiment of the invention.

FIG. 4A is a diagram illustrating a relation among fields defined in a form. The form illustrated in FIG. 4A is an order form for ordering products. There are fields A1 and A2 to display unit price data of each product. There are fields B1 and B2 to display quantity data of each product. There are fields C1, C2, ..., and Cn to display order money amount data of each product. The fields C1 to Cn are set so that data showing a result of multiplication of the unit price field (for example, A1) and the quantity field (for example, B1) is displayed. There is a field D to display data of total of order money amounts of all of the products. The field D is set so that the money amount data obtained by totalizing all of the order money amounts (for example, C1) of each product is displayed.

In the following, a field (such as field C1 or field D) that refers to another field is called a "reference field", while a field (such as field A1 or field B1) that is referred to by another is called a "referred field". Since there is a strong relationship between the reference field and the referred field, there is a strong possibility that the user will want to refer to them simultaneously when inputting insertion data.

Figure 4B:
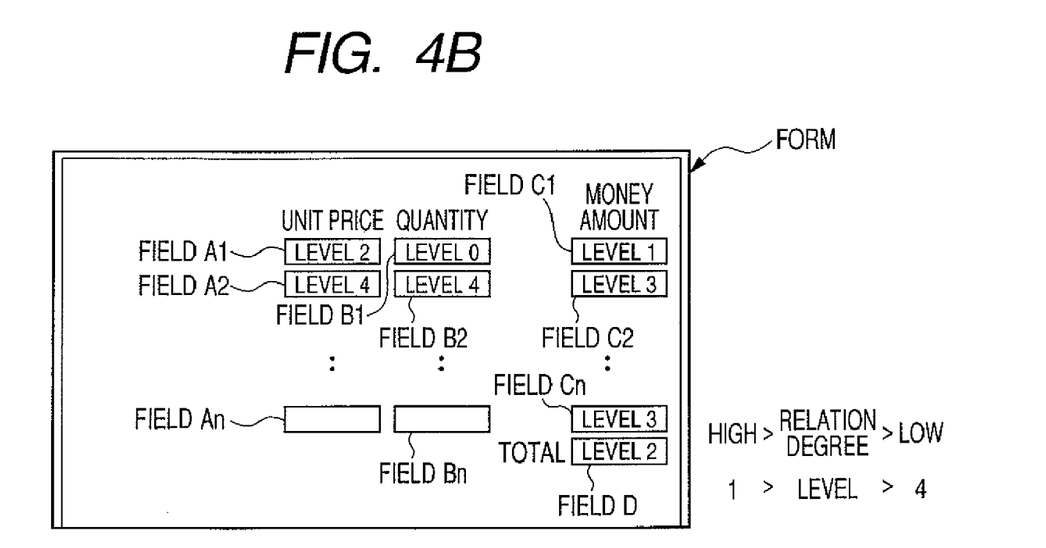

FIG. 4B is a diagram illustrating a state where a relation degree of each field is automatically discriminated when the insertion data is input to the form.

There is used herein the concept of the intensity of the relation between two fields, and that intensity is called the "relation degree". For example, the field B1 is directly referred to by the field C1, which in turn is directly referred to by the field D. Therefore, it can be regarded that the field B1 is indirectly referred to by the field D. The relation degree in the case where the field is directly referred to (hence, where the relation is more "intimate") is larger than that in the case where the field is only indirectly referred to. That is, as seen from the field B1, the relation degree between fields B1 and C1 is higher than that between fields B1 and D. When tracing the referring relation from a given field, the relation degree decreases gradually. When the relation degree is expressed by a numerical value of a plurality of levels, it is herein termed a "relation level". The smaller the numerical value of the relation level, the higher the relation degree is; the larger the numerical value of the relation level, the lower the relation degree is.

As illustrated in FIG. 4B, when seen from field B1, the relation level of field C1 is equal to "1", the relation level of field D is equal to "2", the relation level of each of fields C2 to Cn is equal to "3", and the relation level of field A2 or B2 is equal to "4". The relation level of field B1 itself is equal to "0".

Since fields C2 to Cn are directly referred to by field D, when seen from field B1, the relation level of each of fields C2 to Cn is equal to "3", lower than that of field D by one. Further, fields A2 to An and fields B2 to Bn are fields which are directly referred to by fields C2 to Cn. Therefore, when seen from field B1, the relation levels of fields A2 to An and fields B2 to Bn are equal to "4", which is lower than those of fields C2 to Cn by one.

Figure 4C:
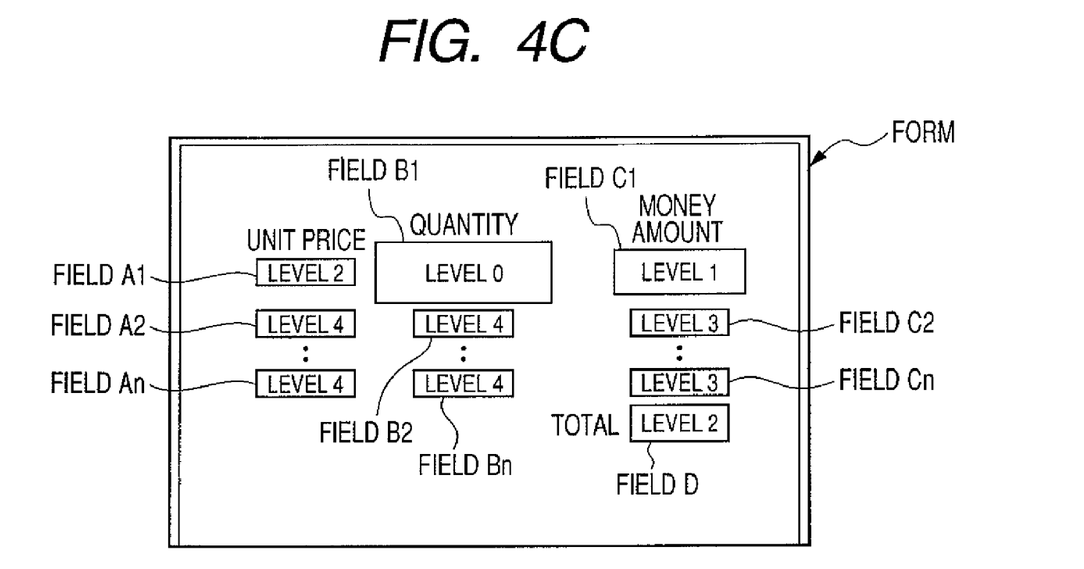

FIG. 4C is a diagram illustrating enlargement or contraction of the display of the field when the insertion data is input, the field being enlarged or contracted to an optimum size according to the relation level of each field.

In the present embodiment, each field is enlarged or contracted according to the relation level and displayed. That is, the larger the relation degree (the lower the relation level is), the more the field is enlarged for display, and conversely, the smaller the relation degree is (the lower the relation level is), the more the field is contracted for display.

Figure 5:
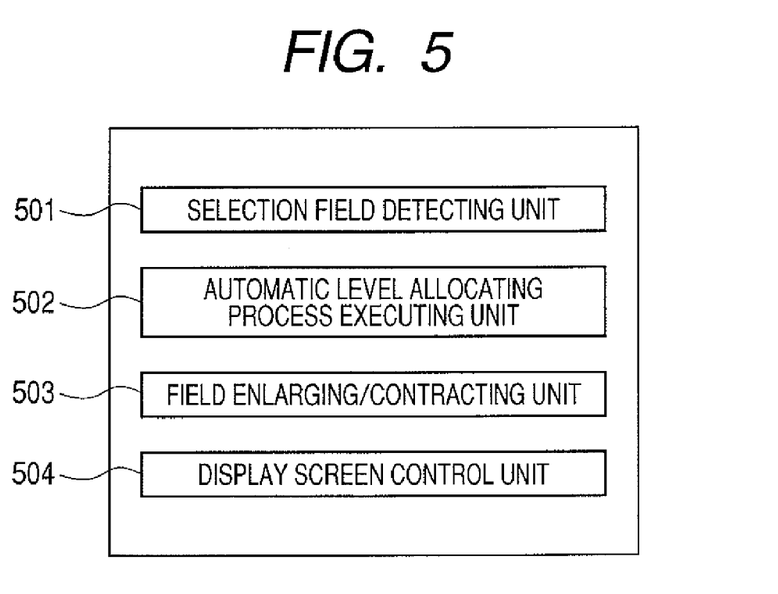
FIG. 5 is a diagram illustrating a functional construction of the computer system according to the embodiment of the invention.

FIG. 5 is a diagram illustrating a functional construction of the computer system according to the embodiment which is realized by a method whereby the CPU 100 executes the program 303. Each functional construction illustrated in FIG. 5 is realized by a method whereby the CPU 100 reads out the program 303 from, for example, the HD 105, loads it into the RAM 102, and executes it.

Figure 9A:
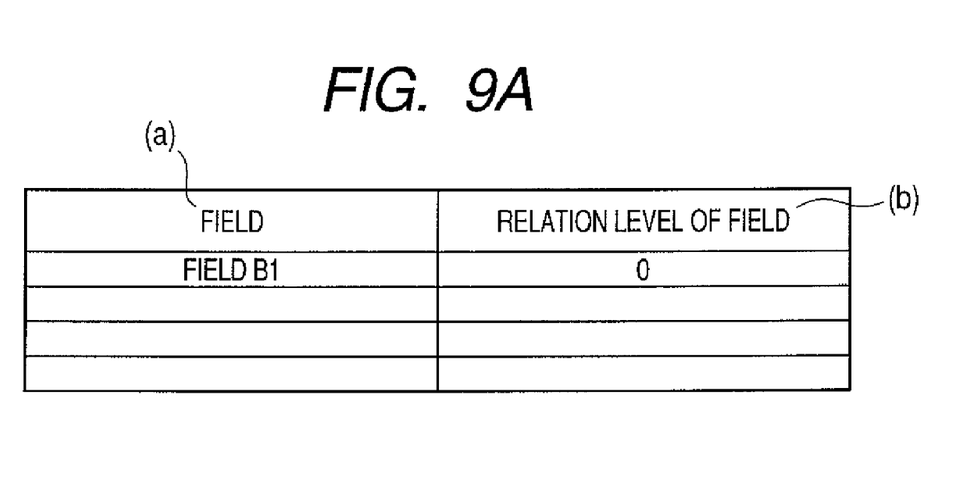
FIGS. 9A and 9B are diagrams schematically showing table constructions for managing the correspondence between the field and its relation level.
Figure 9B:
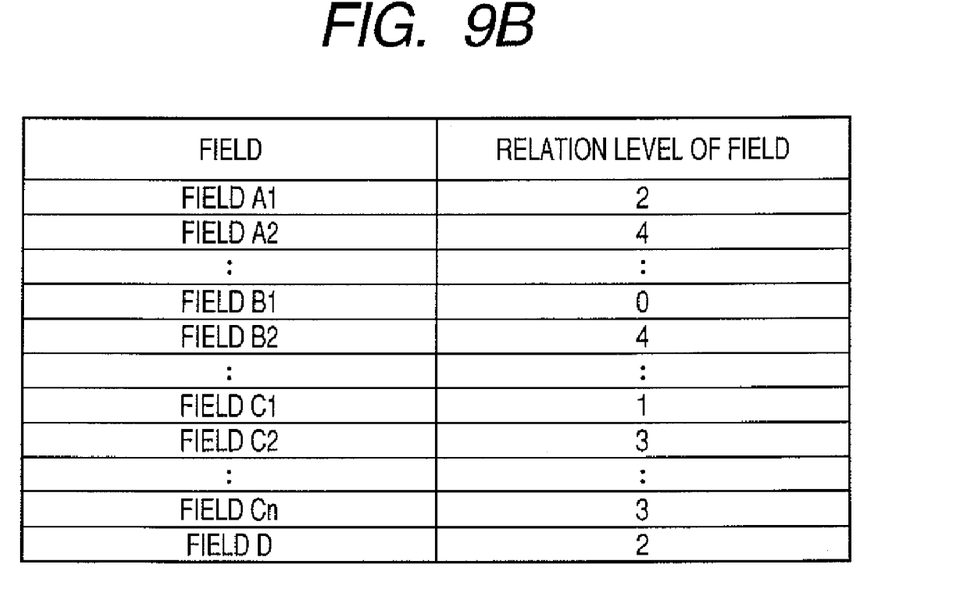

As illustrated in FIG. 5, the computer system according to the present embodiment has, as its functional construction: a selection field detecting unit 501; an automatic level allocating process executing unit 502; a field enlarging/contracting unit 503; and a display screen control unit 504. The selection field detecting unit 501 in this embodiment has a construction as an application example of the selecting unit of the invention. The automatic level allocating process executing unit 502 and a table (which will be described hereinafter and is shown in FIGS. 9A and 9B) are in this embodiment an application example of the managing unit. The field enlarging/contracting unit 503 and the display screen control unit 504 serve as an application example of the display control unit.

Figure 6:
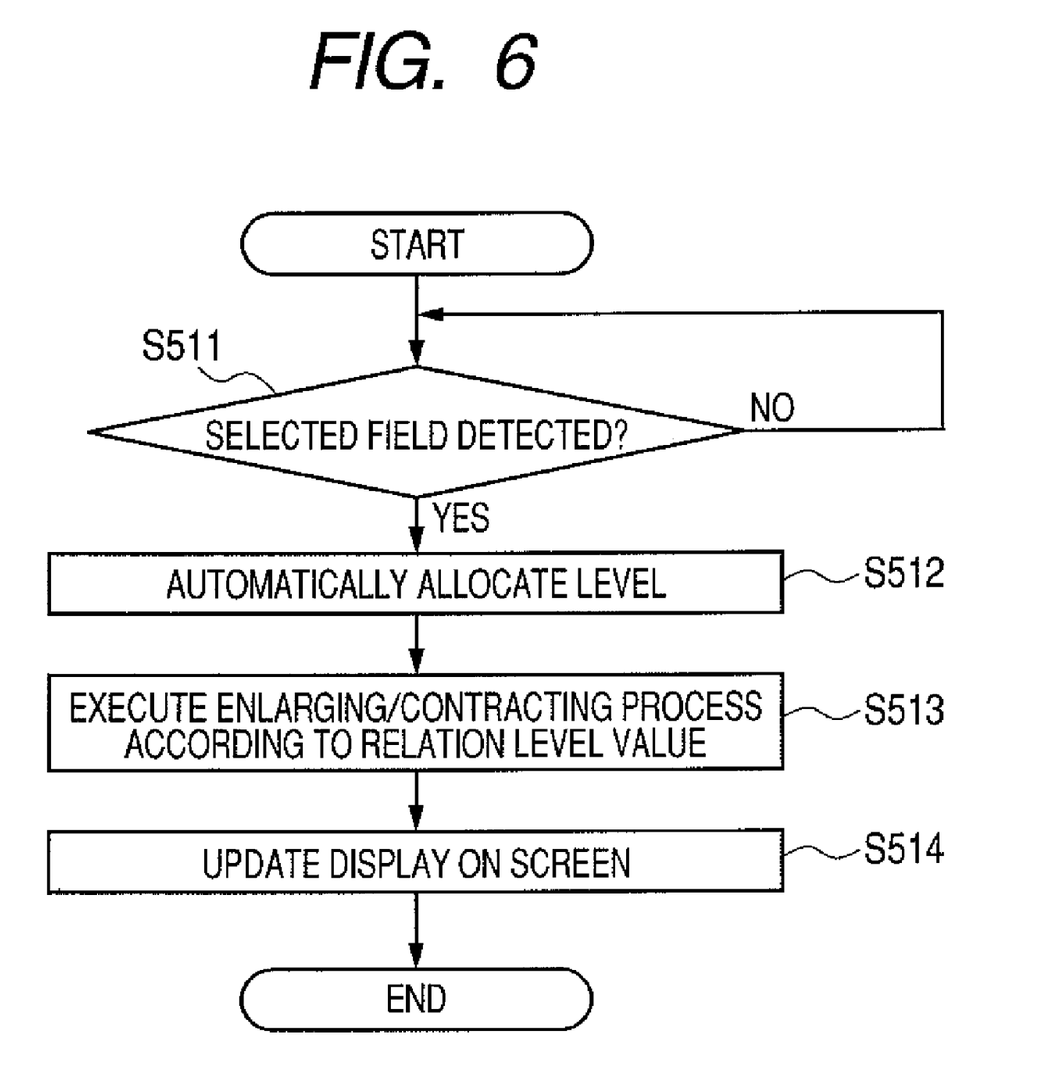
FIG. 6 is a flowchart showing the operation of the computer system according to the embodiment of the invention.

FIG. 6 is a flowchart showing the operation of the computer system according to the present embodiment.

In step 511, the selection field detecting unit 501 discriminates whether or not a field selected by the user exists.

If it is determined that the field selected by the user exists (YES), in step 512, the automatic level allocating process executing unit 502 executes a detecting process of the fields related to the selected field and an automatic level allocating process of each related field. The process of detecting the related fields and that of automatically allocating the level for each field will be described in detail hereinafter. The selected field is called a "selection field", and the field related thereto is called a "related field" hereinbelow.

If it is determined in step 511 that the field selected by the user does not exist (NO), the processing routine is returned to step 511. The selection field detecting unit 501 executes the discriminating process again.

In step 513, the field enlarging/contracting unit 503 executes an enlarging/contracting process on each field according to the relation levels allocated to the selection field and the related fields.

In step 514, the display screen control unit 504 executes an updating process of the input display screen. Thus, for example, as illustrated in FIG. 4C, the display screen showing the fields subjected to the enlarging/contracting process is displayed on the display 107.

Figure 7:
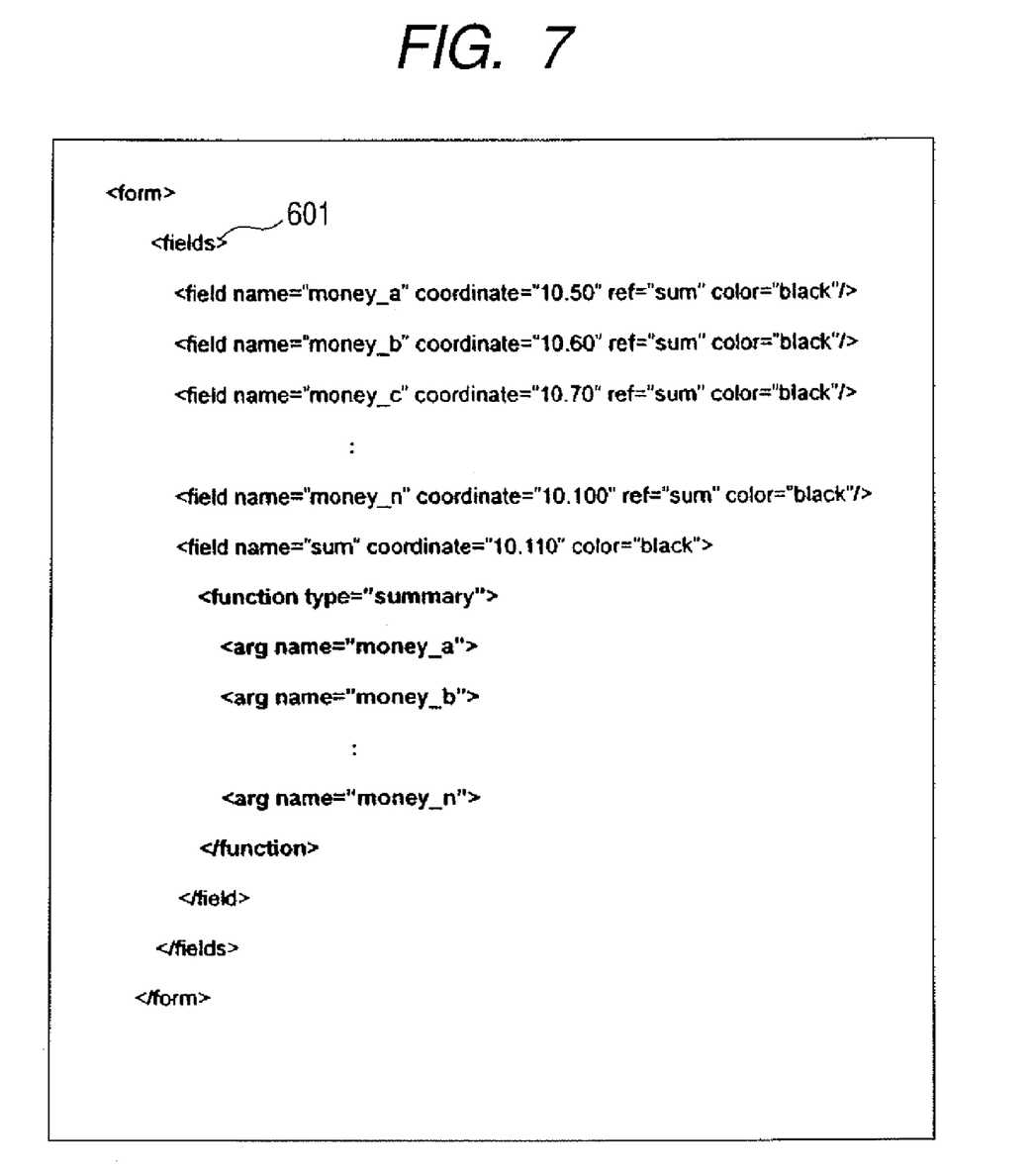
FIG. 7 is a diagram showing an example of contents of a form definition of a target form to be input.

FIG. 7 is a diagram showing an example of contents of a form definition of a target form to be input. In this example, the form definition is expressed in an XML format. Information (coordinates, size, and the like) of a figure constructing the form and the like have been defined in the form definition. The form is constructed by a general figure such as a rectangle, a circle, a straight line, or the like, or by a character figure, a field figure, or the like. The "field figure" is a figure holding display information such as character font, character size, character color, painting color, and the like of the field into which the data is inserted.

The information of the field figure has been defined in 601. A <field> tag indicates one field figure. A name attribute indicates a name of the field figure. A color attribute indicates a character color of the field figure. A coordinate attribute indicates display coordinates of the field figure. A ref attribute exists in the fields which are referred to by another field. An attribute value of the ref attribute is the name of the field figure on a referring source side. For example, since field figures "money_a", "money_b", "money_c", and "money_n" are referred to by a field figure "sum", their ref attribute values are set to "sum". An equation to calculate a total value of the field figures "money_a", "money_b", "money_c", and "money_n" has been set in the field figure "sum". Such an equation is expressed by a <function> tag. An equation type has been described in a value of the <function> tag (in the example, "summary"). The detection of the related fields and the automatic level allocating process of each field are executed based on the form definition.

Figures 8, 8A:
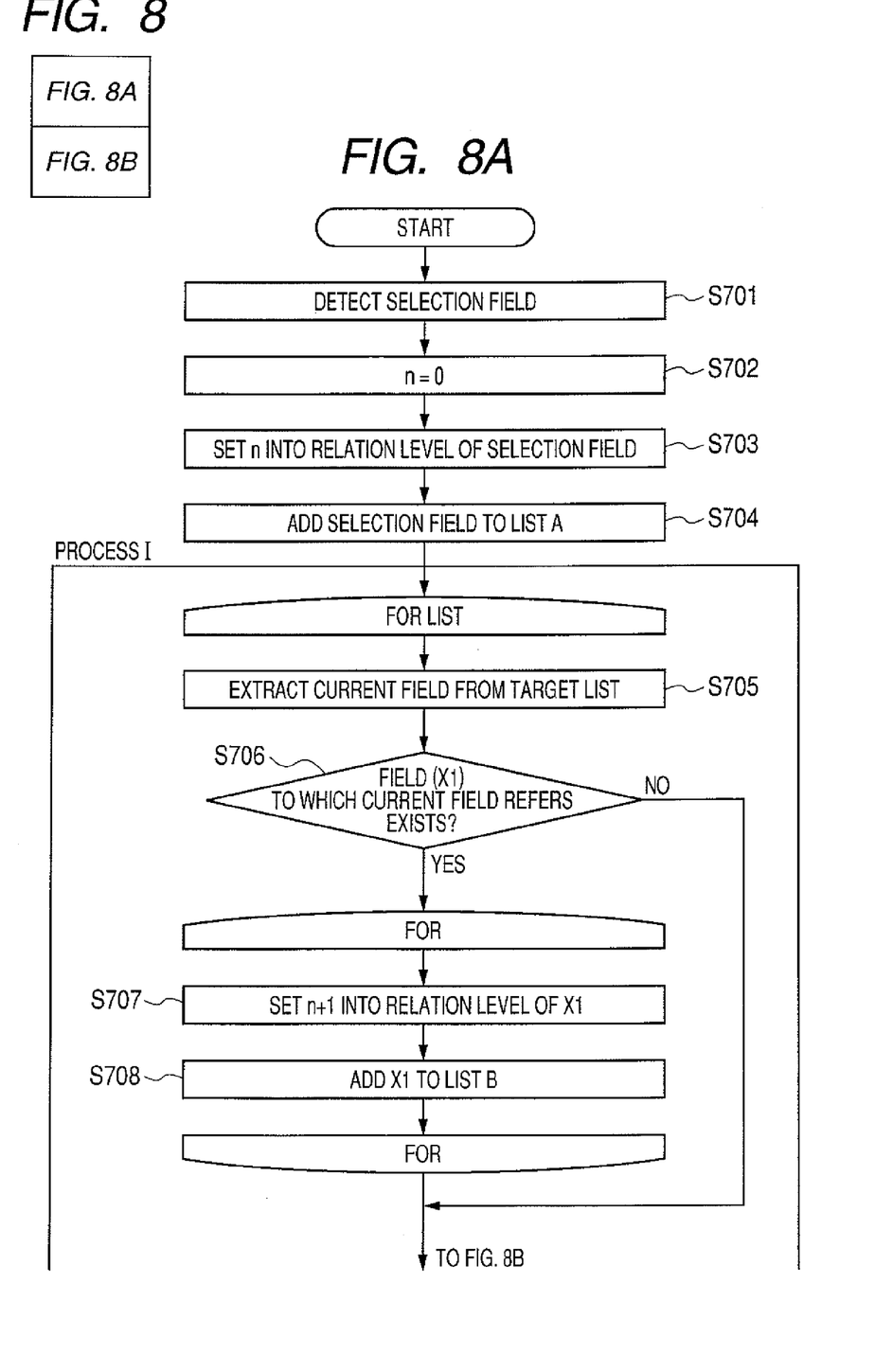
Figure 8B:
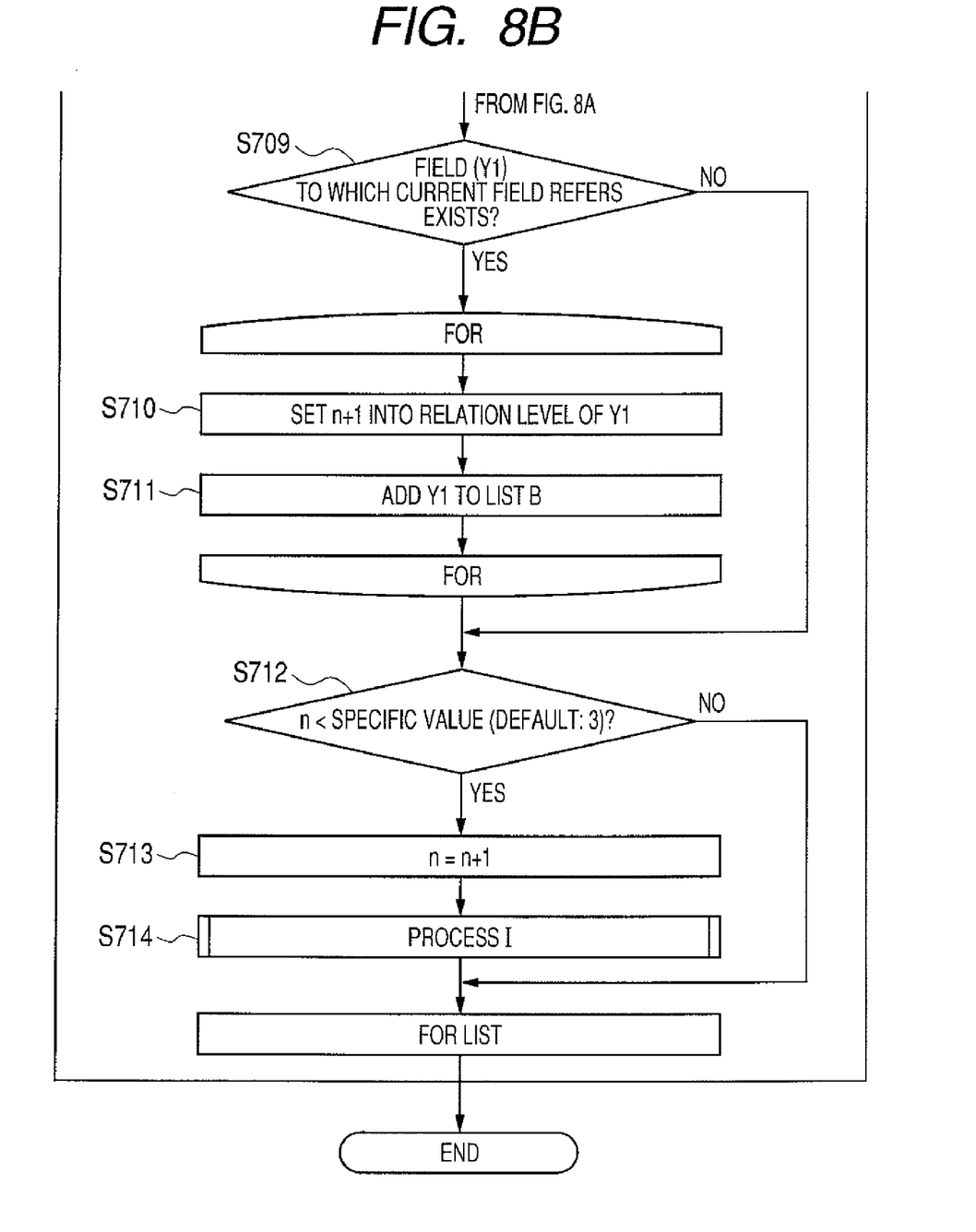

FIG. 8 composed of FIGS. 8A and 8B is a flowchart showing in detail the detecting process of the related fields (step 511 in FIG. 6) and the automatic level allocating process of each field (step 512 in FIG. 6).

In step 701, the selection field detecting unit 501 detects the field (selection field) selected by the user.

In step 702, the automatic level allocating process executing unit 502 sets "0" into a relation level variable n held in the program 303.

In step 703, the automatic level allocating process executing unit 502 sets a value of the relation level variable n (0 in this instance) into the relation level of the selection field detected in step 701. The correspondence between the selection field and the relation level is managed in the RAM 102 by a table as shown in FIG. 9A.

In step 704, the automatic level allocating process executing unit 502 stores the selection field into a list A in the RAM 102. In this instance, a pointer showing a reference destination of the selection field is actually stored.

The processes in steps 705 to 714 are repetitively executed. Those processes are collectively called "processes I". The processes I are processes which are executed on the list. The list serving as a processing target is called a "target list". The target list of the processes I in the first-time loop is list A.

The processes I will be described in detail hereinbelow. In step 705, the automatic level allocating process executing unit 502 extracts one of the elements (fields) from the target list (the selection field is extracted in the first-time loop). After that, the processes are executed on the extracted field. The field which is currently the processing target is called a "current field".

In step 706, the automatic level allocating process executing unit 502 executes a detection and a discrimination of a field that refers to the current field (that is, a reference field of the current field). The discrimination is made based on the form definition contents shown in FIG. 7. If no reference field of the current field is detected, the processing routine advances to step 709.

If a reference field is detected in step 706, in step 707, the automatic level allocating process executing unit 502 sets a value of a relation level variable n+1 into the relation level of the reference field detected in step 706 ("1" is set in the first-time loop).

In step 708, the automatic level allocating process executing unit 502 stores the reference field detected in step 706 into a list B in the RAM 102.

As mentioned above, the processes of steps 707 and 708 are repetitively executed a number of times equal to the number of fields detected in step 706, and the relation levels are set for all of the fields detected in step 706.

In step 709, the automatic level allocating process executing unit 502 executes a detecting process on the field(s) to which the current field refers (referred field of the current field). The discrimination is made based on the form definition contents shown in FIG. 7. If no referred field of the current field is detected, the processing routine advances to step 712.

If a referred field is detected in step 709, in step 710, the automatic level allocating process executing unit 502 sets the value of the relation level variable n+1 into the relation level of the referred field detected in step 709 ("1" is set in the first-time loop).

In step 711, the automatic level allocating process executing unit 502 stores the field detected in step 709 into the list B in the RAM 102.

As mentioned above, the processes of steps 710 and 711 are repetitively executed a number of times equal to the number of referred fields detected in step 709, and the relation levels are set for all of the referred fields detected in step 709.

In step 712, the automatic level allocating process executing unit 502 discriminates whether or not the relation level variable n does not exceed a specific value. The specific value may be fixed in the program or can be also set by the user. It is now assumed that the specific value has been set to "3". If the relation level variable n exceeds the specific value, the processing routine exits from the processes I.

If the relation level variable n does not exceed the specific value, the automatic level allocating process executing unit 502 recursively applies the processes I with respect to the field whose relation level is larger by one stage (the relation degree is lower). Specifically speaking, first, in step 713, the automatic level allocating process executing unit 502 adds "1" to the relation level variable n. Subsequently, in step 714, the automatic level allocating process executing unit 502 calls the processes I. At this time, the list B is designated as a target list of the processes I.

By repeating the processes I as mentioned above, the relation levels are automatically set for all of the fields. The table after the setting becomes as shown in FIG. 9B.

Second Embodiment

The second embodiment of the invention will now be described. In the foregoing first embodiment, the setting of the relation levels has automatically been set. In the second embodiment, the user can preliminarily set the relation levels by a UI (User Interface) displayed on the display 107. That is, the second embodiment differs from the first embodiment with respect to a point that the processes in steps 702, 707, 710, and 713 in FIG. 8 in which the relation levels are automatically set in the first embodiment are replaced by processes in which the relation levels are manually set in the second embodiment. Other processes are similar to those in the first embodiment.

Figure 10:
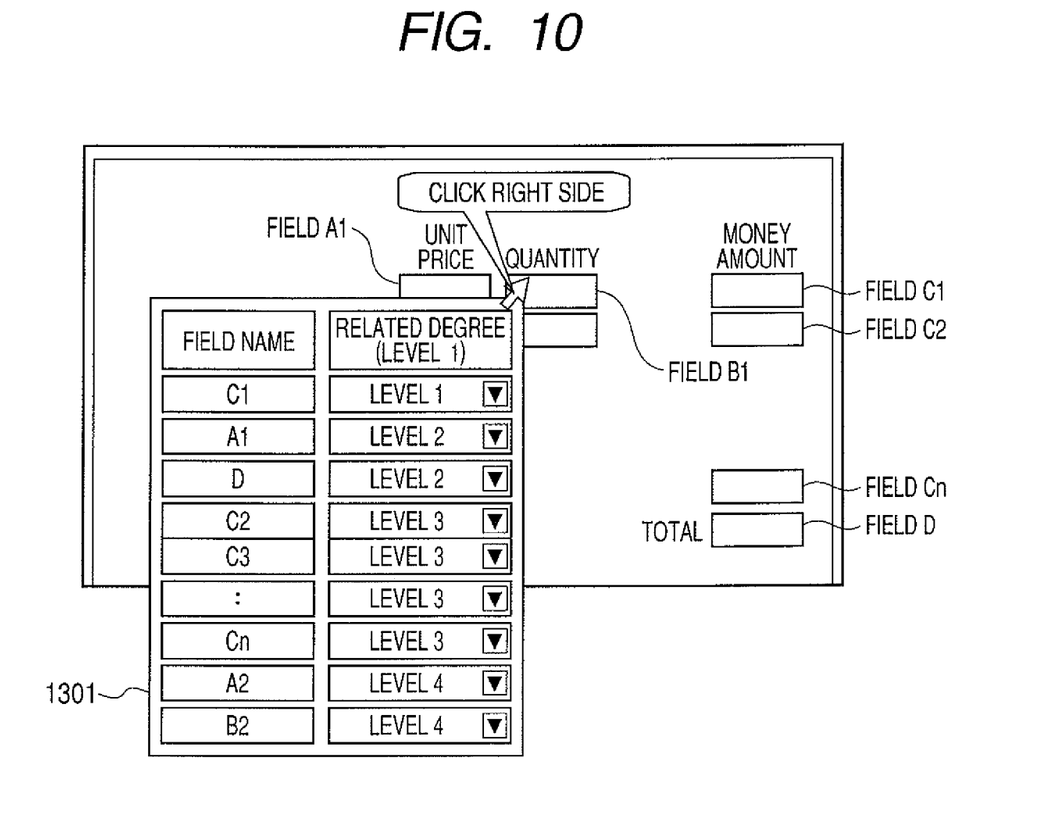
FIG. 10 is a diagram illustrating an example of a construction of a UI display screen which is used for the user to set the relation levels.

FIG. 10 is a diagram illustrating an example of a construction of a UI display screen which is used for the user to set the relation levels. Upon designing of the form, the user sets the relation levels on a form edition display screen. By pressing (clicking) the right button of a mouse on the field which the user wants to set the relation level, a setting UI 1301 to set the relation level is displayed. A list of the fields serving as targets of the relation level setting is displayed.

For example, when the field B1 as a selection field is designated by pressing the right button, the related fields such as field C1, field D, field A1, and the like are displayed as a list on the setting UI 1301. The detecting process of the related fields to be displayed is executed by using the related field detecting process (steps 706 and 709 in FIG. 8) mentioned in the first embodiment.

The field name and relation level of each related field are displayed on the setting UI 1301. The display portion of the relation level is a combo box. By operating the combo box, the relation level can be changed. By operating the combo box corresponding to a desired field in which the user wants to change the relation level, he can change the relation level.

Third Embodiment

The third embodiment of the invention will now be described. The enlarging/contracting process of the related field has automatically been executed in the first embodiment. In the third embodiment, the user can set an enlarging ratio and a contracting ratio according to the relation level.

Figure 11:
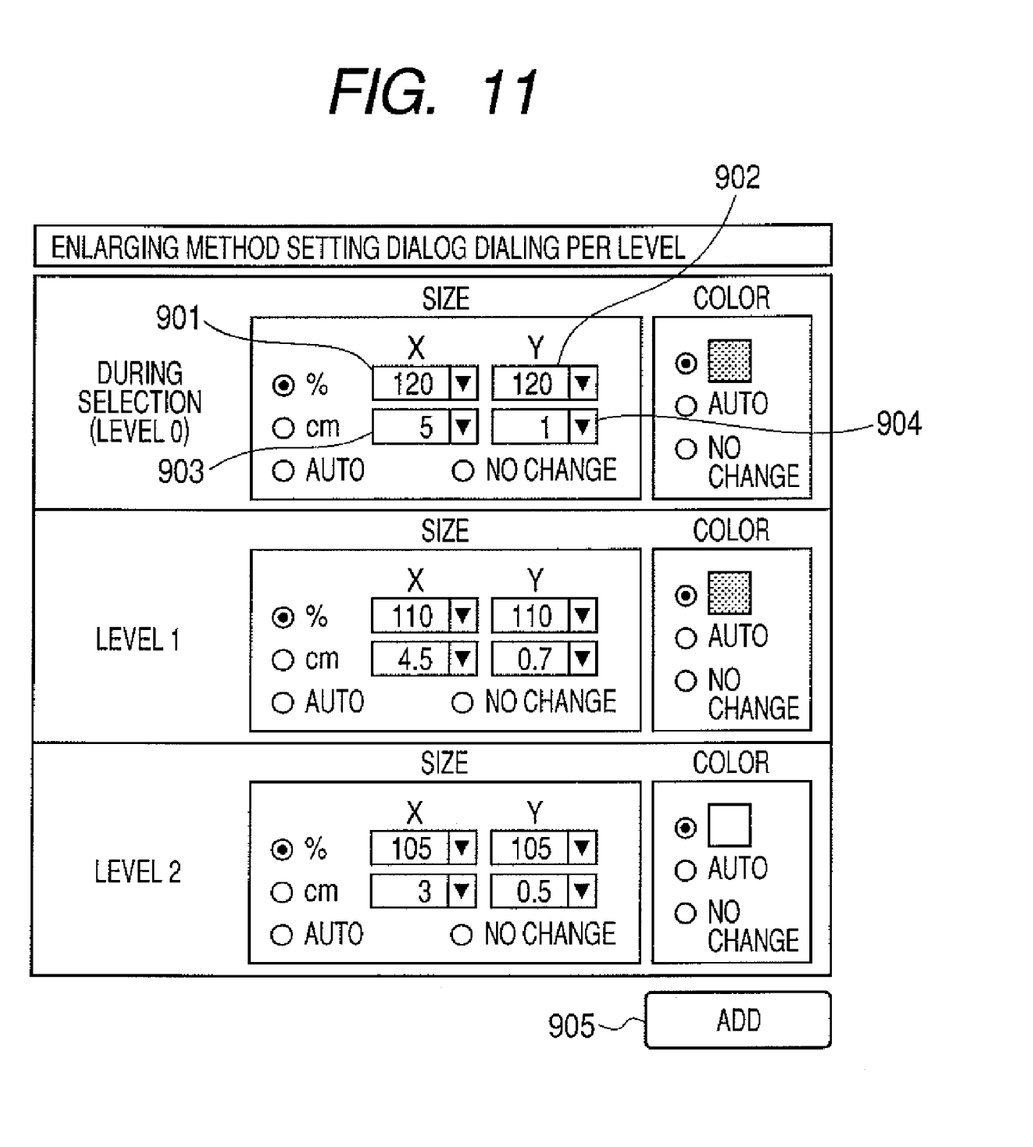
FIG. 11 is a diagram illustrating an example of a user interface which is used for the user to set an enlarging ratio and a contracting ratio according to the relation level.

FIG. 11 is a diagram illustrating an example of a user interface which is used for the user to set the enlarging ratio and the contracting ratio according to the relation level. In the third embodiment, an enlarging/contracting method of the field figure of the relevant relation level can be set with respect to each relation level. That is, the third embodiment differs from the first embodiment with respect to the following point. The enlarging/contracting process according to the relation level has automatically been executed by the process in step 513 in FIG. 6 in the first embodiment. However, in the third embodiment, the user can set the contents of the enlarging/contracting process according to the relation level. Other processes are similar to those in the first embodiment.

By selecting a radio box, the enlarging/contracting method of the size can be selected from "%", "cm", "auto", and "no change". When "%" is selected, the enlarging/contracting ratios in the X direction and the Y direction are input into 901 and 902 by a numerical value of "%", respectively. When "cm" is selected, the sizes in the X direction and the Y direction after the enlargement are input into 903 and 904. The color (background color) of the field figure of the related field to be enlarged can be also changed. In FIG. 11, a desired one of three patterns of "designated color", "auto", and "no change" can be selected by means of radio buttons. By this method, the field to which the user wants to refer can be made conspicuous.

In the example of FIG. 11, only setting columns of the relation levels 0 to 2 are displayed. If the user wants to set the relation level of level 3 or more, it is also possible to construct the embodiment in such a manner that the level setting can be added by clicking an Add button 905.

Subsequently, the processing operation for the case where there are no related fields on the same page will be described. This processing operation, which will be described hereinbelow, can be also applied to any of the foregoing embodiments.

Figure 12:
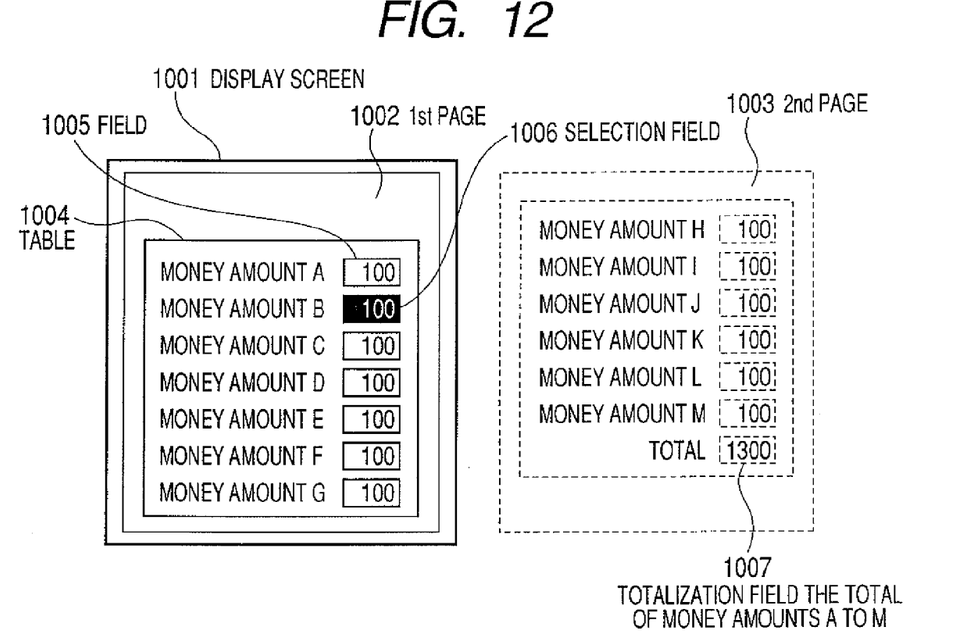
FIG. 12 is a diagram illustrating a state where the related fields cannot be displayed on a same page.

FIG. 12 is a diagram for describing a state where the related fields cannot be displayed on the same page. A document is displayed in a display screen 1001 illustrated in FIG. 12. A table 1004 is included in this document. Data from "money amount A" to "money amount M" is included in each field 1005 in the table 1004. An equation for totalizing the data from "money amount A" to "money amount M" has been set in a totalization field 1007. The table 1004 is constructed by two pages since the number of data is large. The data from "money amount A" to "money amount G" is displayed in a first page 1002. The data from "money amount H" to "money amount M" is displayed in a second page 1003.

In the case of inputting the insertion data to such a document, the following problem occurs. While the user is inputting the fields existing in the first page 1002, he cannot refer to the fields existing in the second page 1003. For example, while selecting a field 1006 of "money amount B", he cannot refer to the totalization field 1007.

Figure 13:
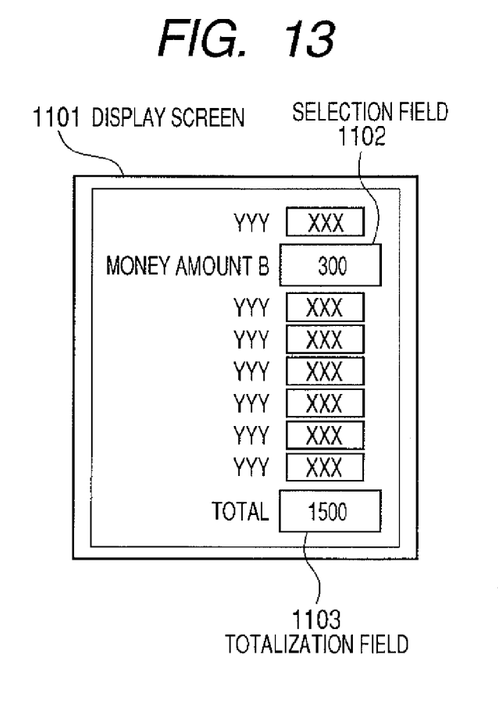
FIG. 13 is a diagram illustrating an example of solving a problem described by using FIG. 12.

FIG. 13 is a diagram illustrating an example of solving the problem described by using FIG. 12. The fields whose relation degrees are small (relation levels are high) are automatically contracted and displayed so that a selection field 1102 (corresponding to the selection field 1006 in FIG. 12) and a totalization field 1103 (corresponding to the totalization field 1007 in FIG. 12) are enclosed in a display screen 1101. At the same time, in order to make the selection field 1102 and the totalization field 1103 (fields whose relation degrees are large (fields whose relation levels are low)) conspicuous, both of those fields can be also enlarged and displayed.

Figure 14:
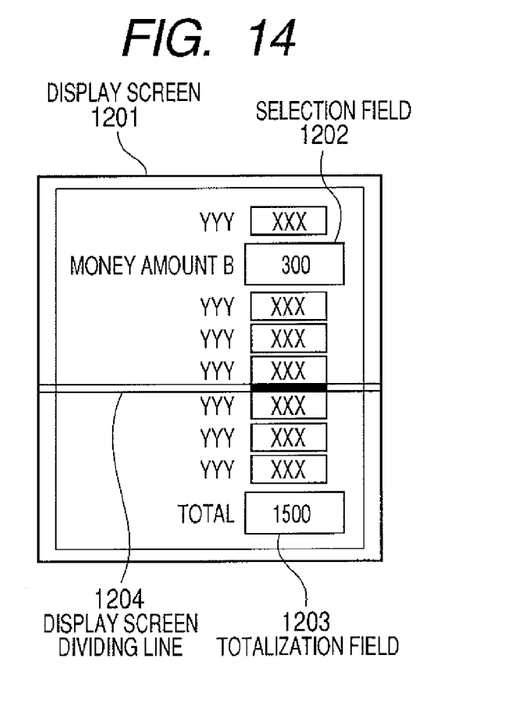
FIG. 14 is a diagram illustrating another example of solving the problem described by using FIG. 12.

FIG. 14 is a diagram illustrating another example of solving the problem described by using FIG. 12. In the example of FIG. 14, a display screen 1201 is divided by a display screen dividing line 1204 so that a selection field 1202 (corresponding to the selection field 1006 in FIG. 12) and a totalization field 1203 (corresponding to the totalization field 1007 in FIG. 12) are enclosed in the display screen 1201. That is, the present computer system decides the totalization field 1203 whose relation degree is large from a plurality of fields and divides the display screen 1201, thereby enabling display areas of the selection field 1202 and the totalization field 1203 to be displayed. Such a functional construction to decide the totalization field 1203 having the large relation degree from a plurality of fields as mentioned above is a construction as one application example of a deciding unit of the invention.

In order to make the selection field 1202 and the totalization field 1203 (fields whose relation degrees are large (fields whose relation levels are low)) conspicuous, both of those fields can be also enlargedly displayed. At the same time, the fields whose relation degrees are small (relation levels are high) can be also contracted. The divided display screen is partitioned by the display screen dividing line 1204.

In the foregoing embodiment, the display control regarding each of the related fields is switched based on the relation degrees between the selection field and the related fields, and the display state of the related fields whose degrees of relation to the selection field are large and the display state of the related fields whose relation degrees to the selection field are not large are made different. Thus, in the case of editing the form data having a plurality of fields, the user can identify the related fields whose degrees of relation to the selection field are large. The operability of the editing operation of the form data can be improved.

The object of the invention is also accomplished by a method whereby a storing medium in which program codes of software for realizing the functions of the embodiments mentioned above have been recorded is supplied to a system or an apparatus and a computer of the system or the like reads out the program codes from the storing medium and executes them.

In this case, the program codes themselves read out of the storing medium realize the functions of the embodiments mentioned above. The program codes themselves and the storing medium in which the program codes have been stored construct the invention.

As a storing medium for supplying the program codes, for example, a flexible disk, a hard disk, an optical disk, a magnetooptic disk, a CD-ROM, a CD-R, a magnetic tape, a non-volatile memory card, a ROM, or the like can be used.

The invention also incorporates a case where the OS or the like which is operating on the computer executes a part or all of the actual processes based on instructions of the program codes read out by the computer and the functions of the embodiments mentioned above are realized by those processes.

Further, the invention also incorporates a case where the program codes read out of the storing medium are written into a memory provided for a function expanding unit or the like connected to the computer, after that, a CPU or the like executes the actual processes based on instructions of the program codes, and the functions of the embodiments mentioned above are realized by those processes.

As mentioned above, in the invention, the display control regarding each of a plurality of other fields is switched based on the relation degrees between the field selected by the user and a plurality of other fields. According to the invention, therefore, the display state of the fields whose degrees of relation to the selection field are large and the display state of the fields whose relation degrees to the selection field are small are made different. Thus, in the case of editing the form data having a plurality of fields, the user can identify the fields whose degrees of relation to the selected field are large. The operability of the editing operation of the form data can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-352926, filed Dec. 27, 2006, which is hereby incorporated by reference herein in its entirety.

What is claimed is:

1. An information processing apparatus for editing form data having a plurality of fields in which data is arranged, the plurality of fields having respective sizes, the apparatus comprising:
   a processor coupled to a memory a memory cooperating to function as:
   a selecting unit that selects one of a plurality of fields that are displayed in a display area according to an operation of a user;
   a display control unit that controls displaying such that, when both the field selected by the selecting unit and a specific field related to the selected field are not displayed in the display area, the specific field and the selected field are displayed in a first display area and a second display area, respectively, by dividing the display area; and
   a changing unit that enlarges a size of the specific field in the first display area, enlarges a size of the selected field in the second display area, and reduces sizes of the plurality of fields other than the specific field and the selected field,
   wherein an equation for totalizing data that includes data of the selected field is set in the specific field, and
   wherein the processor coupled to the memory cooperate to function as a setting unit that provides a user interface for the user to set an enlarging ratio or a contracting ratio according to a relation level by selecting an enlarging method or a contracting method through designation of a percentage, a unit of length, or an automatic setting.

2. A control method of an information processing apparatus for editing form data having a plurality of fields in which data is arranged, the plurality of fields having respective sizes, the control method comprising steps of:
   selecting one of a plurality of fields that are displayed in a display area according to an operation of a user;
   controlling displaying such that, when both the selected field and a specific field related to the selected field are not displayed in the display area, the specific field and the selected field are displayed in a first display area and a second display area, respectively, by dividing the display area; and
   enlarging a size of the specific field in the first display area, enlarging a size of the selected field in the second display area, and reducing sizes of the plurality of fields other than the specific field and the selected field,
   setting, in the specific field, an equation for totalizing data that includes data of the selected field, and
   providing a user interface for the user to set an enlarging ratio or a contracting ratio according to a relation level by selecting an enlarging method or a contracting method through designation of a percentage, a unit of length, or an automatic setting.

3. A non-transitory computer-readable storage medium storing a program that when executed causes a computer to perform a control method of an information processing apparatus for editing form data having a plurality of fields in which data is arranged, the plurality of fields having respective sizes, the control method comprising steps of:

selecting one of a plurality of fields that are displayed in a display area according to an operation of a user;

controlling displaying, such that, when both the selected field and a specific field related to the selected field are not displayed in the display area, the specific field and the selected field are displayed in a first display area and a second display area, respectively, by dividing the display area; and enlarging a size of the specific field in the first display area, enlarging a size of the selected field in the second display area, and reducing sizes of the plurality of fields other than the specific field and the selected field, setting, in the specific field, an equation for totaling data that includes data of the selected field, and providing a user interface for the user to set an enlarging ratio and a contracting ratio according to a relation level by selecting an enlarging method or a contracting method through designation of a percentage, a unit of length, or an automatic setting.

* * * * *